United States Patent Office 2,756,615
Patented July 31, 1956

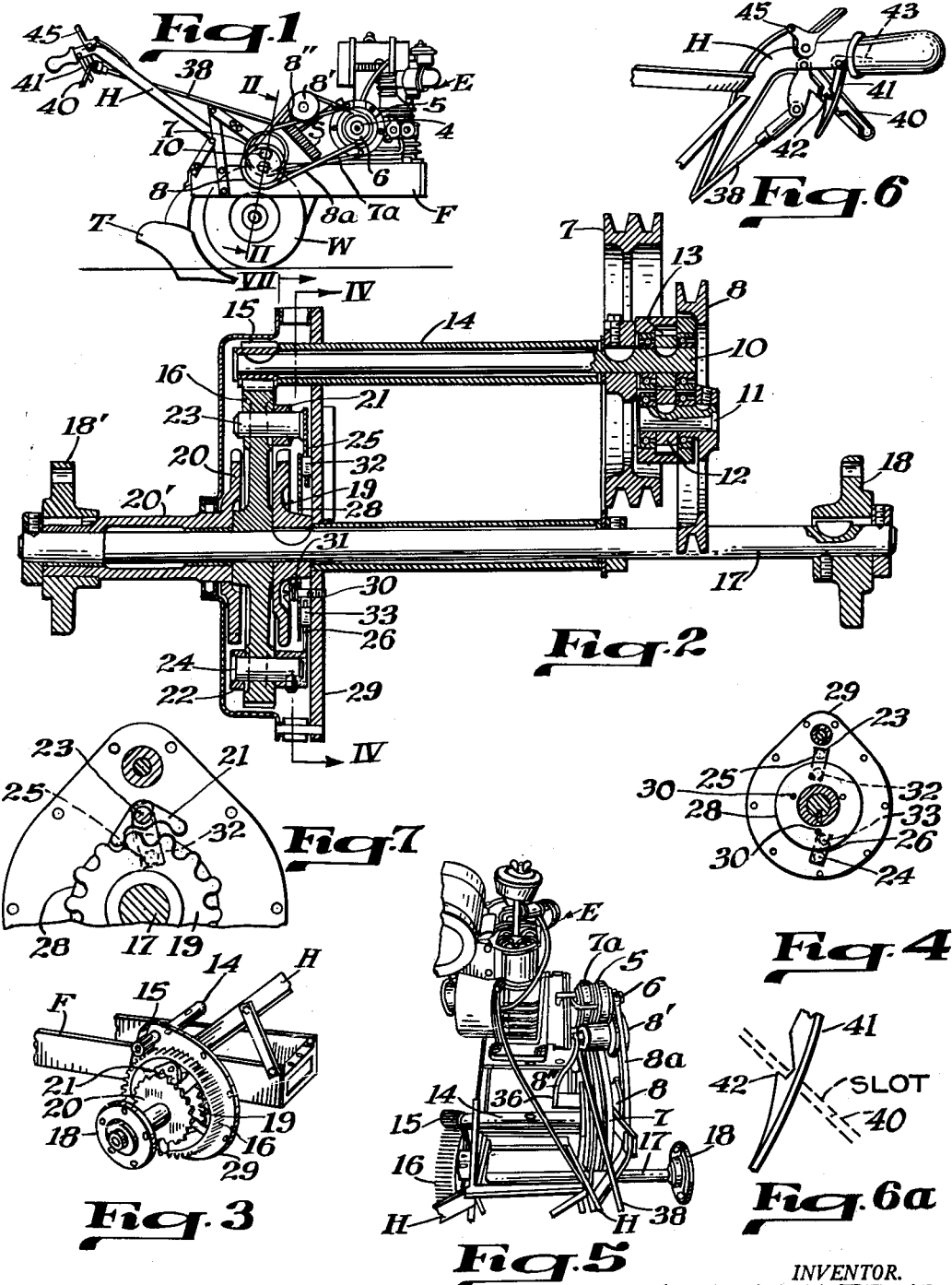
July 31, 1956     J. J. KANTZ, JR     2,756,615
GEARLESS DIFFERENTIAL DRIVE
Filed May 10, 1951
INVENTOR.
JOHN J. KANTZ, JR.
BY Oberlin & Limbach
ATTORNEYS.

2,756,615

GEARLESS DIFFERENTIAL DRIVE

John J. Kantz, Jr., Rock Creek, Ohio, assignor to The Great Lakes Tractor Co., Cleveland, Ohio, a corporation of Ohio Application May 10, 1951, Serial No. 225,561

9 Claims. (Cl. 74—650)

This invention relates to drive construction, and more particularly to a gearless differential drive suitable for use on road vehicles and tractors of utility type as for plowing and cultivating in farm and gardening operations; and especially where in addition to ordinary routine drive, control for accurate close operation forward and reverse is important, as for instance in working varied row and bush crops and around orchard trees, etc. In accordance with the invention a construction may be had which involves a mechanism with forward and reverse and with accurate simple control, such that the machine can be backed and squared around variously for working in close quarters and about obstacles, etc. And, withal there may be had a positive drive on both wheels, in forward and reverse and an over-running means for actuating whereby one wheel can go faster than the other, by the free-wheeling manner of connection. Other objects and advantages will appear from the following description.

To the accomplishment of the foregoing and related ends, the invention then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a side elevational view of a tractor embodying the invention, the upper portion of the traction wheel being in phantom for clarity;

Fig. 2 is a large scale section through the traction wheel shaft axis and the drive countershaft axis taken on a plane approximately represented by line II—II, Fig. 1;

Fig. 3 is a fragmentary perspective view of a detail of the operating mechanism on the traction wheel shaft, at the other side of Fig. 1;

Fig. 4 is a smaller scale sectional detail taken on a plane approximately represented by the line IV—IV, Fig. 2;

Fig. 5 is a top perspective view of a portion of the machine looking toward the right as from the operator's position at the handles in Fig. 1;

Fig. 6 is an enlarged fragmentary detail elevational view of the handle-controls, partly broken away;

Fig. 6a is a fragmentary enlarged detail of the "neutral" control latch 41 of Fig. 6; and Fig. 7 is a fragmentary sectional view of the upper portion of Fig. 2 taken approximately on line VII.

Referring first to Fig. 1, there is shown an embodiment of the invention in a tractor with a pair of traction drive wheels W and frame F supporting a power source, as for example an internal combustion engine E, and interposed between the engine shaft and the traction wheel shaft is a forward and reverse transmission, with control rod extending up to the handle. An earth-working tool, plow, cultivator, etc., illustrated by the plow T, Fig. 1, may be carried by the frame.

The handles H secured to the frame, and directed upwardly and rearwardly, provide means by which the operator of the tractor may in general guide it, on the paired traction wheels W. On the engine shaft 4 are pulleys 5 and 6 which receive belts, preferably V-belts for connecting respectively to pulleys 7, 8 which by the belts drive countershaft 10. The latter, as shown particularly in Fig. 2, has the pulley 7 directly keyed thereto, while the pulley 8 is keyed to the stub shaft 11 adjacent which carries a small gear 12 which also is keyed to stub shaft 11 and which meshes with a corresponding gear 13 which is keyed to the shaft 10. The shafts 10 and 11 are desirably supported in ball bearings with dust-tight housing covering the gears. By this back-gearing arrangement 12, 13, the power transmitted to the shaft 10 by way of the pulley 8 is in reverse direction from that transmitted to the shaft by the pulley 7. The shaft 10, suitably mounted in framing-supports and including a spacing sleeve 14, has secured on its other end a driving pinion 15, which meshes with a large gear 16 free on the traction wheel shaft 17. In Fig. 2, the traction wheels are removed from the hubs 18 and 18' to simplify the showing. On each side of the gear wheel 16 is a ratchet wheel 19, 20, unconnected to the gear except if locked thereto by the dog 21 or the dog 22. Each of these dogs 21, 22 has two oppositely-directed pawl-arms and is centered to rock either way as carried by respective stub shafts 23, 24 in the gear wheel 16. Each dog thus can be turned to engage one or the other pawl-arm with its ratchet wheel or in intermediate position be entirely free or in "neutral." Extending from the inner end of stub shaft 23, is an arm 25 which has a hole near one end in which a button is loosely retained, as referred to more fully hereinafter, while stub shaft 24 has a similar arm 26 also with a perforation retaining a button. These arms actuate the dogs 21, 22 in relation to the ratchet wheels 19, 20, and are concerned in whether the machine will travel forward or in reverse or permit free-wheeling, depending upon which way it is desired to operate. The arms extend between a stationary disc 28 and another stationary plate, which may conveniently be the casing plate 29 on the tractor frame. The disc 28 is anchored by screws or bolts, one of which, 30 is shown in the section at Fig. 2, the others being equi-spaced in arc therefrom. Under the head of the screw is a short coil spring 31 which presses the disc 28 toward the plate 29. It will be understood that there is ample clearance between the center of the disc 28 and the hub of the ratchet 19 so that the latter revolves, but the disc 28 is held stationary on its mounting screws 30, etc., and is pressed by the springs 31 toward the plate 29. And between the stationary disc 28 and the stationary plate 29 are tripper-elements or the buttons 32, 33, centered in the holes in arms 25, 26, Figs. 2, 4 and 7, unattached but bindingly held in the grip between disc 28 and plate 29. The ratchet wheel 19 is keyed directly to the traction wheel shaft 17, as is also the wheel hub 18, while ratchet wheel 20 with its integral sleeve 20' is keyed to wheel hub 18'. When gear 16 is caused to rotate in either direction the buttons 32, 33, caused to drag by friction between spring-pressed disc 28 and plate 29, rotate stub shafts 23, 24 with their respective dogs 21, 22 until the dogs fall into ratchet wheel teeth 19, 20, thereby driving shaft 17 or ratchet sleeve 20' which carries the driving wheels W.

When making turns or going down hill, either or both dogs can be overrun by the respective wheels turning faster thereby causing the ratchet wheels 19, 20 to become the driving member which will push the dogs 21, 22 out of mesh with said ratchet wheels and cause them to run freely.

One means for turning power-transmitting wheel or gear 16 is for example by the drive belt 7a from the pulley 5 on the engine shaft to the pulley 7 on the countershaft, this being the direct or forward drive means, and preferably this is a double belt, as shown more clearly at Fig. 5; while the belt 8a from pulley 6 on the engine shaft to the pulley 8 with its backgearing to the countershaft 10 is the reverse drive means. When the vehicle is stationary both direct and reverse drive belts are slack or in neutral. But each belt is put into operation by appropriate respective tightening by pressure of an idler pulley 8' which has faces to accommodate both. The idler pulley 8' is carried by an arm 8" which is pivoted at its lower end to the frame at 36, Fig. 5. By this arrangement, the idler pulley 8' is in neutral when midway between the drive belts, and it can be pressed downward upon the belt 7a for direct or forward drive, and in such case the reverse belt 8a is slack and out of action. Alternatively, the idler pulley 8' can be raised against the reverse belt 8a thereby tightening the reverse belt for operation and making the other belt inoperative. To press the idler pulley 8' against the direct drive belt 7a as mentioned, there is a strong coil spring s fastened at its lower end to the frame and at its upper end to the swing arm 8" which carries the idler pulley. Thus, when allowed to act, the coil spring or tension spring s sets the drive for direct or forward. A one-hand control is provided. The operator's control means for neutral, forward and reverse includes a hand-actuated rod 38 which is connected at its lower and forward end to the swing arm 8" which carries the idler pulley 8', and at its upper and rear end is pivoted to a bell-crank hand-lever 40, Figs. 1 and 6, which is pivoted on the handle H. The coil spring s tends to normally pull both arm 8" and rod 38 downwardly and forwardly and hold the drive in "forward." A latch 41 also pivoted to the handle projects through a slot in the lever 40 and has a notch 42 which normally catches against the forward edge of the slot for holding the neutral position of the idler pulley 8' in the lever 40, Figs. 6 and 6a. The latch 41 is urged forwardly to catch the lever 40 by an L-shaped spring 43, Fig. 6, with one arm in a groove in the handle and the other in a grooved latch. When the latch is tripped by the operator's hand, the control rod 38 is released from "neutral" and the action of the spring s draws the idler pulley against the forward drive belt. As shown in Fig. 6, the control lever 40 is in locked position with the latch 41, and the tension spring s at the idler pulley arm 8" is held midway or neutral from both belts. If however, the lever 40 be pulled up against the handle by the operator's fingers, the rod 38 pulls the idler pulley arm 8" upwardly and rearwardly and tightens the idler 8' against the reverse drive belt 8a, and the machine will back as long as the operator holds the control lever 40 in such position. When he releases his grip on such lever, the spring s pulls the idler pulley away and the latch 41 catches and locks the lever 40 in neutral. An important safety provision is thus had, as for example should the operator stumble in backing, the machine stops and it cannot injure him. And the entire control is centered for operation by one hand. Engine speed is controlled by the customary throttle lever 45 pivoted on the handle in reach of the operator's thumb, and a spring-biased rod connects to the engine throttle.

As noticed, each time that the forward drive belt is put into operation, it turns the pulley 7 on the countershaft 10 and through the pinion 15 turns the gear 16 which then occasions the drag on the buttons 32, 33 to move the arms 25, 26 and set the dogs 21, 22 into the ratchets 19, 20 for direct forward drive of the traction wheel shaft 17 and hub 18'. And vice versa, when the reverse belt is put into operation, the pulley 8 through the back-gearing 12, 13, turns the shaft 10 in the other direction and with the beginning movement of the gear 16 creates the drag on buttons 32, 33 to move the arms 25, 26 and set the dogs 21, 22 into the ratchet wheels 19, 20 for reverse drive of the traction wheel shaft 17 and wheel hub 18'. The relative position of the arms 25, 26 and the buttons 32, 33 is shown in Fig. 4, and Fig. 7 shows how the dog is a centered pawl which by the operation of gear 16 can thus be moved either way into position to engage the ratchet wheel.

When the operator's control lever 40 is latched in neutral and the idler 8' is correspondingly slacked between both belts, the traction wheels W are free for wheeling in either direction if the dogs are also in neutral, and the operator can freely swing the machine around right or left ad libitum. It will be understood that the dogs 21, 22 may be disengaged from the ratches 19, 20 by a slight forward or reversing movement of the wheels by bodily manipulation by the operator when no power is being put through gear 16, and this puts the dogs in intermediate out-of-engagement relation to the ratchets or in a free-wheeling position, until power be applied and starts to turn the dog-carrying wheels 16. The construction provides the utility of a differential gear with positive drive on both wheels and advantages of free-wheel action, in addition to a one-hand controlled precise forward and reverse drive and automatic set in neutral unless and until manually changed therefrom.

Other modes of applying the principle of the invention may be employed, change being made as regards the details described, provided the features stated in any of the following claims, or the equivalent of such, be employed.

I therefore particularly point out and distinctly claim as my invention:

1. In construction of the character described having a shaft, a pinion thereon, a gear driven by said pinion, a wheel shaft on which the gear turns, a pair of traction wheels, one on a sleeve loose on said wheel shaft and the other secured to the wheel shaft, a pair of ratchet wheels, one secured to said sleeve and the other secured to said wheel shaft, rockable dogs on said gear each having two oppositely-directed pawl-arms for alternative engagement or intermediate standing neutral with respect to the teeth of each ratchet wheel, a stub carrying each dog and having an arm projecting in a plane transverse to the wheel shaft, stationary plates between which said arms extend free from contact with the plates, an opening in each dog-arm, a button freely movable in each such opening, and spring means for bindingly pressing the unattached buttons in frictional drag between said plates.

2. In construction of the character described having a shaft, a pinion thereon, a gear driven by said pinion, a wheel shaft on which the gear turns, a pair of traction wheels, one on a sleeve loose on said wheel shaft and the other secured to the wheel shaft, a pair of ratchet wheels, one secured to said sleeve and the other secured to said wheel shaft, rockable dogs on said gear each having two oppositely-directed pawl-arms for alternative engagement or intermediate standing neutral with respect to the teeth of each ratchet wheel, a stub carrying each dog and having an arm projecting in a plane transverse to the wheel shaft, stationary plates between which said arms extend spaced from contact with said plates, unattached buttons between said plates as dog-actuating means, and spring means bindingly pressing the unattached buttons in frictional drag between said plates.

3. In construction of the character described having a shaft, a pinion thereon, a gear driven by said pinion, a shaft on which the gear turns, a sleeve loose on said shaft, a pair of ratchet wheels, one secured to said sleeve and the other secured to the shaft, rockable dogs on said gear each having two oppositely-directed pawl-arms for alternative engagement or intermediate standing neutral with respect to the teeth of each ratchet wheel, a stub carrying each dog and having an arm projecting in a plane transverse to the shaft, stationary plates between which said arms extend free from contact with the plates, an opening in each dog-arm, a button freely movable in each such opening, and spring means for bindingly pressing the unattached buttons in frictional drag between said plates.

4. In construction of the character described having a shaft, a pinion thereon, a gear driven by said pinion, a shaft on which the gear turns, a sleeve loose on said shaft, a pair of ratchet wheels, one secured to said sleeve and the other secured to the shaft, rockable dogs on said gear each having two oppositely-directed pawl-arms for alternative engagement or intermediate standing neutral with respect to the teeth of each ratchet wheel, a stub carrying each dog and having an arm projecting in a plane transverse to the shaft, stationary plates between which said arms extend spaced from contact with said plates, buttons floatingly attached to said arms and located between said plates as dog-actuating means, and spring means bindingly pressing the buttons in frictional drag between said plates.

5. In construction of the character described having a shaft, a pinion thereon, a gear driven by said pinion, a wheel shaft on which the gear turns, a sleeve loose on said shaft, a pair of ratchet wheels, one secured to said sleeve and the other secured to said shaft, rockable dogs on said gear each having two oppositely-directed pawl-arms for alternative engagement or intermediate standing neutral with respect to the teeth of each ratchet wheel, a stub carrying each dog and having an arm projecting in a plane transverse to the wheel shaft, stationary plates between which said arms extend free from contact with the plates, a button for actuating each said arm and being floatingly attached thereto, and spring means applying pressure on said buttons for frictional retardation to rock the dog relative to its ratchet wheel.

6. In construction of the character described having a shaft and a drive including a sleeve loose on said shaft and a pair of ratchet wheels, one secured to the sleeve and the other secured to the shaft, rockable dogs on said gear each having two oppositely-directed pawl-arms for alternative engagement or intermediate standing neutral with respect to the teeth of each ratchet wheel, a stub carrying each dog and having an arm projecting in a plane transverse to said shaft, stationary plates adjacent and between which said arms extend without contacting the plates, screws supporting one said plate relative to the other, springs under the heads of the screws pressing one plate toward the other, and floating buttons in frictional engagement between the plates by such pressure and actuating the stub-arm to move the dogs relative to their ratchet wheels.

7. In construction of the character described having a shaft, a pinion thereon, a gear driven by said pinion, a wheel shaft on which the gear turns, a pair of traction wheels, one on a sleeve loose on said wheel shaft and the other secured to the wheel shaft, a pair of ratchet wheels, one secured to said sleeve and the other secured to said wheel shaft, rockable dogs on said gear each having two oppositely-directed pawl-arms for alternative engagement with the ratchet or intermediate standing neutral to permit free traction wheel movement, a stub carrying each dog and having an arm projecting, and means for actuating the dog-arms, including floating buttons and spring means for applying pressure on said buttons 8. In construction of the character described including a shaft, a sleeve loose thereon, a gear also loose on said shaft, a ratchet wheel secured to said shaft and another ratchet wheel secured to said sleeve on the shaft, movable dogs carried by studs on said gear and being engageable with the respective ratchet wheels, spaced-apart stationary plates in relation to the ratchet wheels, an arm extending from each said dog in a plane transverse to said shaft, an opening in each said arm, and a floating button in each opening frictionally engaging said plates to actuate the dogs relative to their ratchet wheels.

9. In construction of the character described including a shaft, a sleeve loose thereon, a gear also loose on said shaft, a ratchet wheel secured to said shaft and another ratchet wheel secured to said sleeve on the shaft, movable dogs carried by stubs on said gear and being engageable with the respective ratchet wheels, each dog having oppositely-directed pawl-arms and an actuating arm, and means to engage such actuating arms including floating buttons, spaced-apart plates and spring means for applying pressure for frictional drag between the buttons and plates.

References Cited in the file of this patent

UNITED STATES PATENTS

| Number | Name | Date |
|---|---|---|
| 196,291 | Ewart | Oct. 23, 1877 |
| 336,588 | Rice | Feb. 23, 1886 |
| 618,637 | Benier | Jan. 31, 1899 |
| 705,588 | Huber | July 29, 1902 |
| 1,049,869 | Kendrick | Jan. 7, 1913 |
| 1,262,562 | Reiche | Apr. 9, 1918 |
| 1,363,910 | Parker | Dec. 28, 1920 |
| 1,450,440 | Hudson | Apr. 3, 1923 |
| 1,811,038 | Amidon | June 23, 1931 |
| 1,817,873 | Bready | Aug. 4, 1931 |
| 2,445,797 | Moore | July 27, 1948 |
| 2,450,262 | Winslow | Sept. 28, 1948 |
| 2,531,819 | Lewis | Nov. 28, 1950 |
| 2,535,615 | Ausdall | Dec. 26, 1950 |
| 2,598,768 | Donald | June 3, 1952 |